US009490691B2

(12) United States Patent
Keil

(10) Patent No.: US 9,490,691 B2
(45) Date of Patent: Nov. 8, 2016

(54) DEVICE AND METHOD FOR SURGE CURRENT PROTECTION DURING THE OPERATION OF A CAPACITIVE LOAD ON A THREE-PHASE INVERTER

(71) Applicant: Deere & Company, Moline, IL (US)

(72) Inventor: Roger Keil, Wiesbaden (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/708,395

(22) Filed: May 11, 2015

(65) Prior Publication Data
US 2015/0326010 A1     Nov. 12, 2015

(30) Foreign Application Priority Data

May 12, 2014 (DE) .......................... 10 2014 208 834

(51) Int. Cl.
*H02M 1/36* (2007.01)
*H02H 9/04* (2006.01)
*H02M 7/537* (2006.01)
*B60L 1/00* (2006.01)
*H02M 1/10* (2006.01)
*H02M 7/5387* (2007.01)

(52) U.S. Cl.
CPC .............. *H02M 1/36* (2013.01); *B60L 1/006* (2013.01); *H02H 9/04* (2013.01); *H02M 1/10* (2013.01); *H02M 7/537* (2013.01); *B60L 2200/28* (2013.01); *B60L 2270/20* (2013.01); *H02M 7/5387* (2013.01)

(58) Field of Classification Search
CPC .............. B60L 1/006; B60L 2200/28; B60L 2270/20; H02M 1/10; H02M 1/36; H02M 3/1584; H02M 7/48

USPC ...... 323/271, 272, 901, 908; 361/93.9, 93.1; 363/49, 98, 132

See application file for complete search history.

(56) References Cited

U.S. PATENT DOCUMENTS

| 6,275,393 | B1 * | 8/2001 | Baudelot | H02M 7/062 320/166 |
|---|---|---|---|---|
| 2009/0140702 | A1 | 6/2009 | Schulte et al. | |
| 2013/0106328 | A1 * | 5/2013 | Kopiness | H02M 1/36 318/400.11 |
| 2015/0229203 | A1 * | 8/2015 | Esmaili | H02H 9/001 363/49 |

OTHER PUBLICATIONS

German Search Report issued in counterpart application No. 10 2014 208 834.8, dated Nov. 12, 2014 (7 pages). The Search Report refers to US 2009/0140702, in particular to paragraphs [0012], [0042]; claim 1; Figs. 1, 3.

EPO Search Report issued in counterpart application No. 102014208834.8 dated Oct. 27, 2015 (7 pages).

* cited by examiner

*Primary Examiner* — Gary L Laxton
*Assistant Examiner* — Kyle J Moody

(57) ABSTRACT

A method, device, and system for surge current protection on a circuit including a three-phase inverter and a capacitive load. The inverter can be controlled to connect the capacitive load with different direct current voltage potentials. In a pre-charging mode, the capacitive load is connected with the a first direct current voltage potential via a current-limiting element to limit a start-up current. In a normal operating mode following the pre-charging mode, the inverter is controlled to directly connect the capacitive load with the different direct current voltage potentials.

15 Claims, 5 Drawing Sheets

DEVICE AND METHOD FOR SURGE CURRENT PROTECTION DURING THE OPERATION OF A CAPACITIVE LOAD ON A THREE-PHASE INVERTER

CLAIM FOR PRIORITY

This application claims the benefit of priority to German Application No. DE 102014208834.8 filed May 12, 2014, the contents of which are hereby incorporated by reference.

FIELD OF THE DISCLOSURE

The invention concerns a device and a method for surge current protection during the operation of a capacitive load on a three-phase inverter.

BACKGROUND

Field work with electrically driven implements and/or attachments with agricultural tractors is becoming increasingly important. Providing the electrical energy needed for this is carried out by the agricultural tractor, and for this reason, it has one or more sockets to supply the electrically driven implement with electrical energy. The sockets are typically in the rear section. Such a configuration is known, for example, from agricultural tractors of the 6RE model from John Deere. The sockets can be connected here with a three-phase inverter, supplied from a direct current intermediate circuit of the agricultural tractor. The three-phase inverter comprises, for each of the phases, two switching devices, which are serially located between a positive and a negative supply voltage potential of the direct current intermediate circuit, wherein a pickup, leading to an associated first, second, or third load output of the three-phase inverter, is provided between the switching devices. In this way, it is possible to connect each of the load outputs, either with the positive supply voltage potential or the negative supply voltage potential of the direct current intermediate circuit, wherein it is possible, by an appropriate control of the switching devices, to produce not only a two- or three-phase alternating current, but also a direct current. In the latter case, relatively high start-up currents may appear precisely with the start-up of capacitive loads, which has required an expensive internal performance monitoring system for the regulation of the three-phase inverter.

SUMMARY

The device in accordance with the invention can include a three-phase inverter with first second and third load outputs, which can be connected with a first direct current voltage potential or a second direct current potential that differs, in comparison to the first direct current voltage potential, by the appropriate control of the associated switching devices. In a pre-charging mode, by controlling the switching means in a current-limiting branch, the capacitive load can be connected with the first direct current voltage potential, via the first load output, by means of an intermediate current-limiting element, in particular a current-limiting resistor or a current-limiting inductance, and, via the third load output, with the second direct current voltage potential, so that a start-up current that appears between the three-phase inverter and the capacitive load is limited in accordance with its magnitude. In a normal operating mode, following the charging mode, the capacitive load is directly connected, via the second load output, with the first direct current voltage potential and, via the third load output, with the second direct current voltage potential, by controlling the switching devices in a power supply branch.

In other words, the switching devices of the three-phase inverter, which are in any case available, are used to implement the two modes wherein, in addition to a changed control, only an additional current limitation element is to be provided. The device in accordance with the invention is therefore characterized by a particularly low additional construction expense.

The switching devices are typically power MOSFETs or IGBTs, which are controlled by means of a control device, comprised by the three-phase inverter, to make available a desired output current type, optionally, a two- or three-phase current or a direct current. The switching from the pre-charging mode to the normal operating mode can be time-controlled by the control device, or in accordance with a start-up current detected by means of the current-limiting element. The latter makes it possible for the current limitation to be cancelled only if the start-up current flowing during the pre-charging of the capacitive load and detected by means of the current-limiting element has dropped to noncritical values.

The current-limiting element in the normal operating mode can be short-circuited at least occasionally, in order to avoid a possible interruption of the power supply of the capacitive load, as may occur in the case of a sequential switching from the pre-charging mode to the normal operating mode.

The control device can control the switching devices of the three-phase inverter in such a way that during the pre-charging mode, only the switching devices in the current-limiting branch located between the first load output and the first direct current voltage potential or the third load output and the second direct current voltage potential are closed, whereas the other switching devices remain open. In the subsequent normal operating mode, the switching device in the power supply branch located between the second load output and the first direct current voltage potential is also closed by the control device, so that the current-limiting element in the power supply branch is bridged over and any existing current limitation during the supply of the capacitive load with electrical energy is cancelled. Subsequently, the switching devices in the current-limiting branch located between the first load output and the first direct current voltage potential can be opened, or else continue to be closed.

Typically, the first direct current voltage potential is a positive supply voltage potential and/or the second direct current voltage potential is a negative supply voltage potential of a potential-free direct current circuit provided for the supply of the three-phase inverter. The direct current circuit can be a direct current intermediate circuit supplied from an electrical energy storage unit and/or a crankshaft generator, wherein the three-phase current produced by the crankshaft generator is rectified before being introduced into the direct current intermediate circuit by means of an additional, inversely operated three-phase inverter. The electrical energy storage unit is, for example, a lithium ion battery that is common in vehicle uses.

The capacitive load can be designed as a storage capacitor for the operation of a direct current load, for example, a three-phase current motor, operated via an appropriate three-phase inverter. The storage capacitor is thereby used for buffering possible load peaks during the operation of the direct current load.

Moreover, it is conceivable to provide an electric plug connection for the reversible separation of the device in accordance with the invention into a power supply module, comprising a three-phase inverter, and a drive module, comprising the capacitive load, wherein the current-limiting element is associated either with the power supply module or the drive module. The power supply module can be one of several electrical systems of the agricultural tractor, whereas the drive module can be a component of an electrically driven implement or attachment. For the case in which the current-limiting element is associated with the drive module, its value can be specifically adapted to the individual capacitive load or the start-up current that can, in that respect, be expected during the start-up. An association with the power supply module has, on the other hand, the advantage that a surge current protection can also take place with those drive modules which themselves do not have a corresponding current-limiting element. Since, in this case, a common current-limiting element is provided for all capacitive loads that may appear, its value is to be selected in such a way that this reliably covers all start-up currents that are to be expected. The electrical plug connection can be constructed on the tractor as a socket placed in the rear or front section. A complementarily designed plug coupling can be connected to this on the implement. The socket or the plug coupling can be used, in addition to making available electrical energy, to transfer diverse data or sensor signals for the control and monitoring of the electrically driven implement or the drive module comprised by it.

The device in accordance with the invention or the method in accordance with the invention for surge current protection during the operation of a capacitive load on a three-phase inverter is explained in more detail below, with the aid of the appended drawings. Components which, with respect to their function, coincide or are comparable are thereby marked with the same reference symbols.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
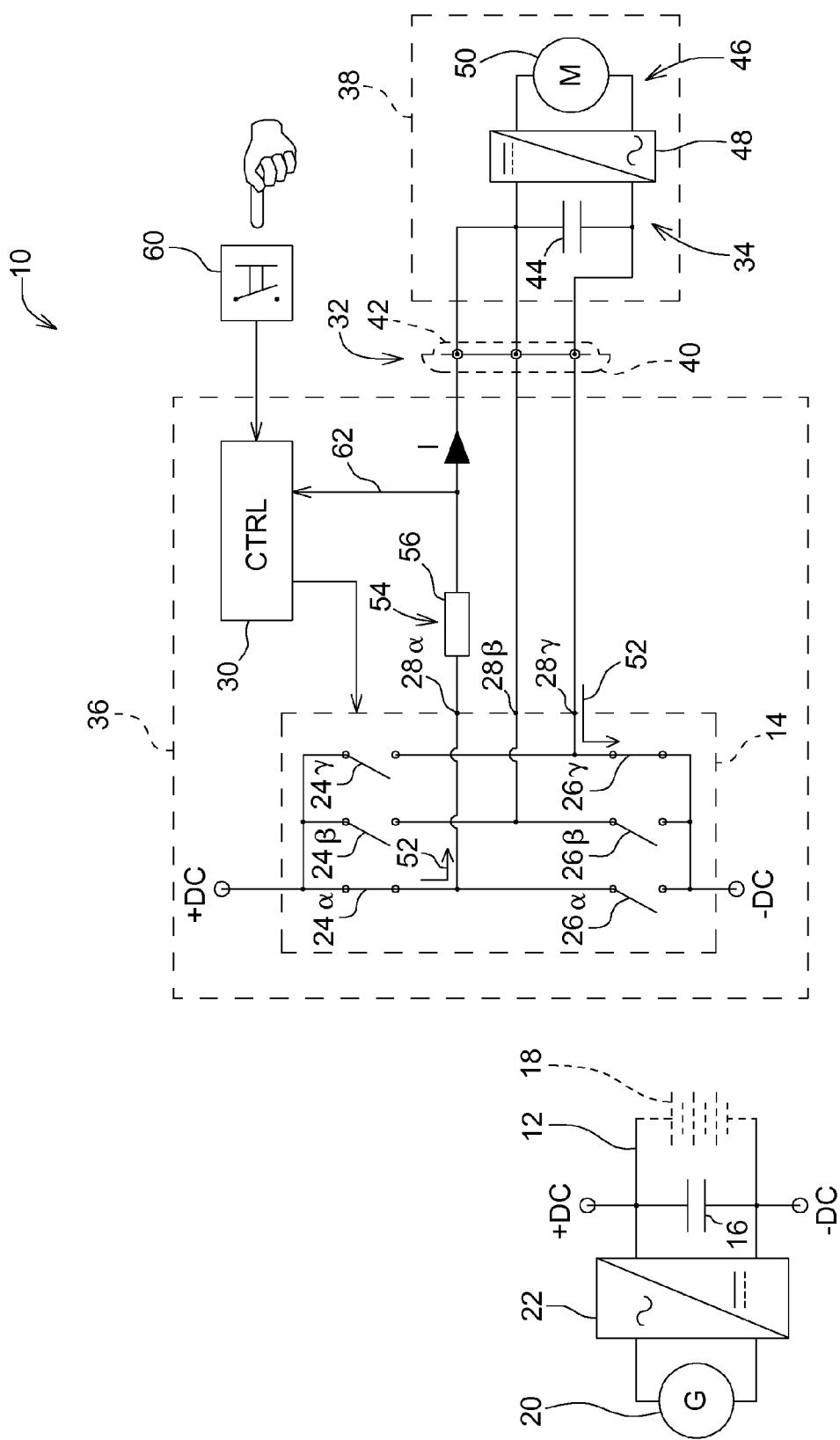
FIG. 1 is a schematic illustrating a first example embodiment of the device in accordance with the invention for surge current protection during the operation of a capacitive load on a three-phase inverter in a pre-charging mode.
Figure 2:
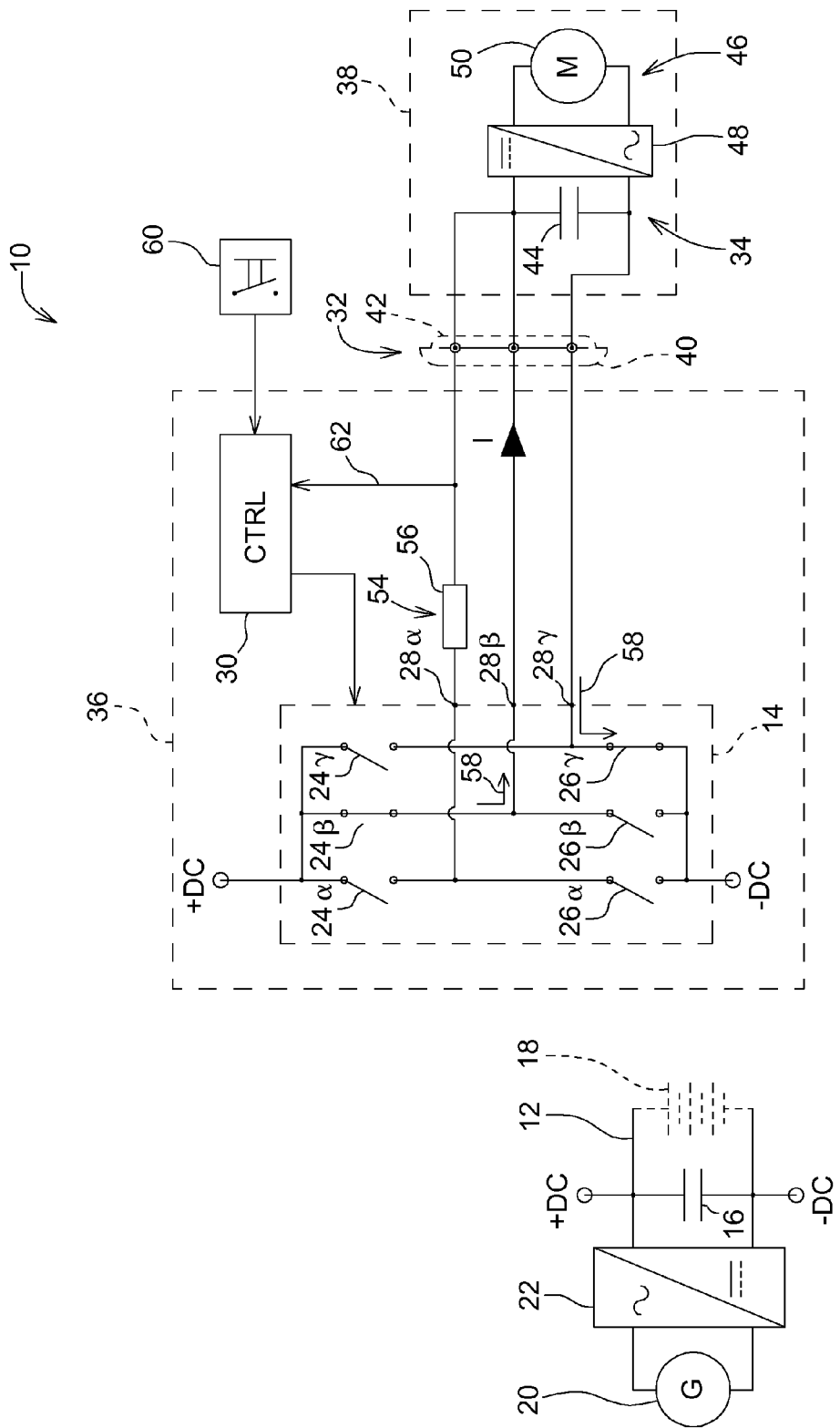
FIG. 2 is a schematic illustrating the first example embodiment of the device in accordance with the invention shown in FIG. 1, in a normal operating mode, following the pre-charging mode.
Figure 5:
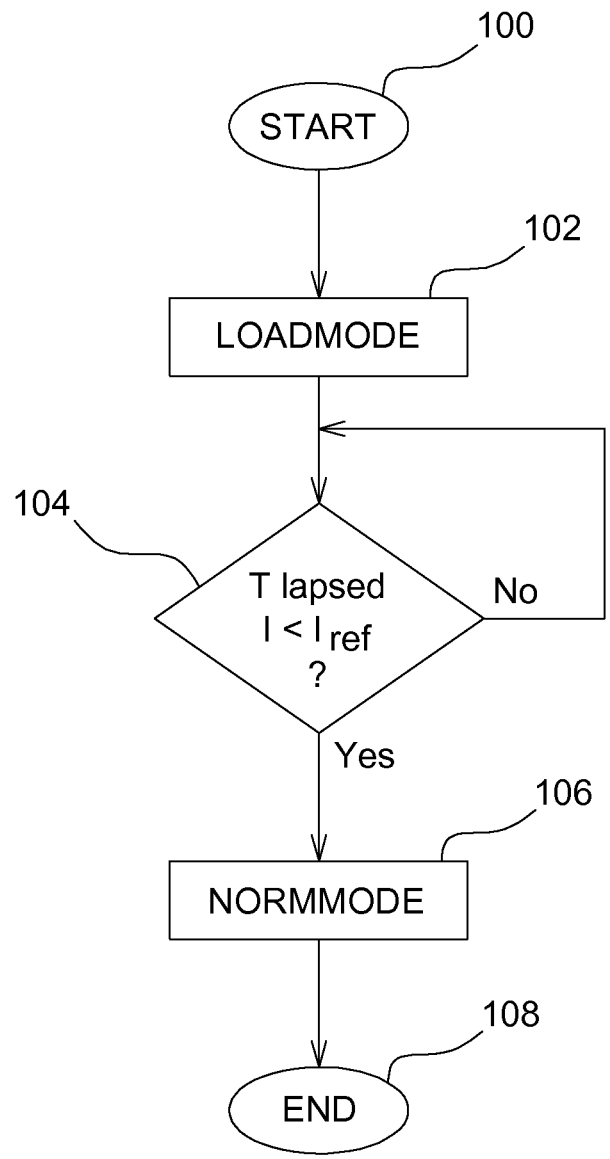
FIG. 5 is a flow chart illustrating an example method in accordance with the invention for surge current protection during the operation of a capacitive load on a three-phase inverter.

FIGS. 1 and 2 show a first example embodiment of the device in accordance with the invention for an agricultural tractor (not shown) in various modes, wherein the first example embodiment is described in the context of the mode of functioning of the device in accordance with the invention with reference to the method in accordance with the invention shown in FIG. 5.

The device 10 comprises a three-phase inverter 14 of a conventional design, which is supplied from a direct current intermediate circuit 12 of the agricultural tractor. The direct current intermediate circuit 12, buffered by means of a first storage capacitor 16, is supplied, in turn, from an optionally provided electrical energy storage unit 18, in the form of a lithium ion battery, common in vehicle applications, and/or a crankshaft generator 20 of the agricultural tractor, wherein the three-phase current produced from the crankshaft generator 20 is rectified, by means of an additional inversely operated three-phase inverter 22, before its introduction into the direct current intermediate circuit 12. The direct current intermediate circuit 12 is hereby made potential-free for the galvanic separation, relative to the ground potential of the agricultural tractor.

The three-phase inverter 14 comprises two switching devices $24\alpha$, $24\beta$, $24\gamma$, $26\alpha$, $26\beta$, $26\gamma$, which are located serially between a positive supply voltage potential −DC of the direct current intermediate circuit 12, for each of the three phases $\alpha$, $\beta$, $\gamma$, wherein a pickup, leading to an associated first, second, or third load output $28\alpha$, $28\beta$, $28\gamma$ of the three-phase inverter 14, is provided between the switching devices $24\alpha$, $24\beta$, $24\gamma$, $26\alpha$, $26\beta$, $26\gamma$. The switching devices $24\alpha$, $24\beta$, $24\gamma$, $26\alpha$, $26\beta$, $26\gamma$, designed in the case under consideration as IGBTs, can be controlled by a control device 30 comprising the three-phase inverter 14. By a corresponding control of the switching devices $24\alpha$, $24\beta$, $24\gamma$, $26\alpha$, $26\beta$, $26\gamma$, it is possible to connect each of the load outputs $28\alpha$, $28\beta$, $28\gamma$ either with the positive supply voltage potential +DC or the negative supply voltage potential −DC of the direct current intermediate circuit 12. This permits the production of both a two- or three-phase alternating current as well as a direct current.

The following considerations are limited to a direct current operation of the three-phase inverter 14 and a capacitive load 34 connected to the three-phase inverter 14 via an electrical plug connection 32.

The electrical plug connection 32 is used for the reversible separation of the device 10 into a power supply module 36, comprising the three-phase inverter 14, and a drive module 38, comprising the capacitive load 34. The power supply module 36 is one of several electrical systems of the agricultural tractor, whereas the drive module 38 is a component of a non-depicted, electrically driven implement or attachment.

The electrical plug connection 32 is made as a socket 40, which is placed in the rear or front section of the tractor. A complementarily designed plug coupling 42 can be connected to the socket 40 on the implement. The socket 40 or plug coupling 42 is used for, in addition to making available electrical energy, the transfer of diverse data or sensor signals for the control and monitoring of the electrically driven implement or the drive module 38 comprised by it.

In the case under consideration, the capacitive load 34 is designed as a second storage capacitor 44 for the operation of a direct current load 46 comprised by the electrically driven implement or the drive module 38, for example, a three-phase motor 50 operated via an associated three-phase inverter 48. The second storage capacitor 44 is hereby used for increasing the capacity of the first storage capacitor 16 and thus for buffering possible load peaks during the operation of the direct current load 46.

FIG. 1 shows the device 10 in a pre-charging mode LOADMODE, in which the capacitive load 34 is connected with the positive supply voltage potential +DC by controlling the switching devices 24α, 26γ in a current-limiting branch 52, via the first load output 28α, by means of a current-limiting element 54 in the form of an interposed current-limiting resistor 56, and with the negative supply voltage potential via the third load output 28γ, so that a start-up or charging current I that appears between the three-phase inverter 14 and the capacitive load 34 is limited in accordance with its magnitude. Such a charging current I always appears if the capacitive load 34 is not sufficiently charged when it is started. In accordance with the example, the current-limiting resistor 56 is associated with the power supply module 36. It should be noted hereby that, instead of the current-limiting resistor 56, the use of a current-limiting inductance is also conceivable.

FIG. 2 shows the device 10 in a normal operating mode NORMMODE, following the pre-charging mode LOADMODE, in which the capacitive load 34 is directly connected with the positive supply voltage potential +DC, via the second load output 28β, by controlling the switching devices 24β, 26γ in a power supply branch 58, and with the negative supply voltage potential –DC, via the third load output 28γ, and any existing current limitation is cancelled during the supply of the capacitive load 34 with electrical energy.

As can be deduced from the flow chart shown in FIG. 5, due to an operator request prompted via an operating element 60 and indicated in FIG. 1, the method for the operation of the device 10 is started as soon as the control device 30 detects, in an initialization step 100, that a direct current operation of the three-phase inverter 14 is intended.

In a first step 102, following the initialization step 100, the device 10 is put into the pre-charging mode LOADMODE. To this end, the control device 30 controls the three-phase inverter 14 in such a way that only the switching devices 24α, 26γ in the current-limiting branch 52 located between the first load output 28α and the positive supply voltage potential +DC or the third load output 28γ and the negative supply voltage potential –DC are closed, whereas the other switching devices 24β, 24γ, 26α, 26β remain open.

In order to decide whether the pre-charging mode LOADMODE is to be ended and the device 10 is to be placed in the normal operating mode NORMMODE, a test is carried out in a second step 104 to determine whether a time counter T has fallen short and/or a prespecified threshold value Iref has not been attained by the charging current I since the beginning of the direct current operation. If this is true, then one continues with a third step 106 in which the device 10 is switched to the normal operating mode NORMMODE. Otherwise, the second step 104 is run through once again. The switching from the pre-charging mode LOADMODE to the normal operating mode NORMMODE is therefore carried out by the control device 30 in a time-controlled manner or in accordance with the charging current I that is detected by means of the current-limiting resistor 56 via a sensor line 62, shown in FIGS. 1 and 2. The latter makes it possible for the current limitation to be cancelled when the charging current I flowing during the pre-charging of the capacitive load 34 and detected by means of the current-limiting resistor 56 has dropped to noncritical values, therefore, when the voltages applied on the two storage capacitors 16, 44 are essentially the same.

For the switching of the device 10 from the pre-charging mode LOADMODE to the normal operating mode NORMMODE, the switching device 24β in the power supply branch 58 located between the second load output 28β and the positive supply voltage potential +DC is also closed in the third step 106, so that the current-limiting resistor 56 is short-circuited or bridged over in the power supply branch 58. Subsequently, the switching device 24α in the current-limiting branch 52 located between the first load output 28α and the positive supply voltage potential +DC is opened in accordance with the representation in FIG. 2 or continues to remain closed.

In other words, the current-limiting resistor 56 is, at least from time to time, short-circuited in the normal operating mode in order to avoid a possible interruption of the power supply of the capacitive load 34, as is conceivable in the case of a sequential switching of the device 10 from the pre-charging mode to the normal operating mode.

In a final step 106, following the second step 104, the method is finally ended.

Figure 3:
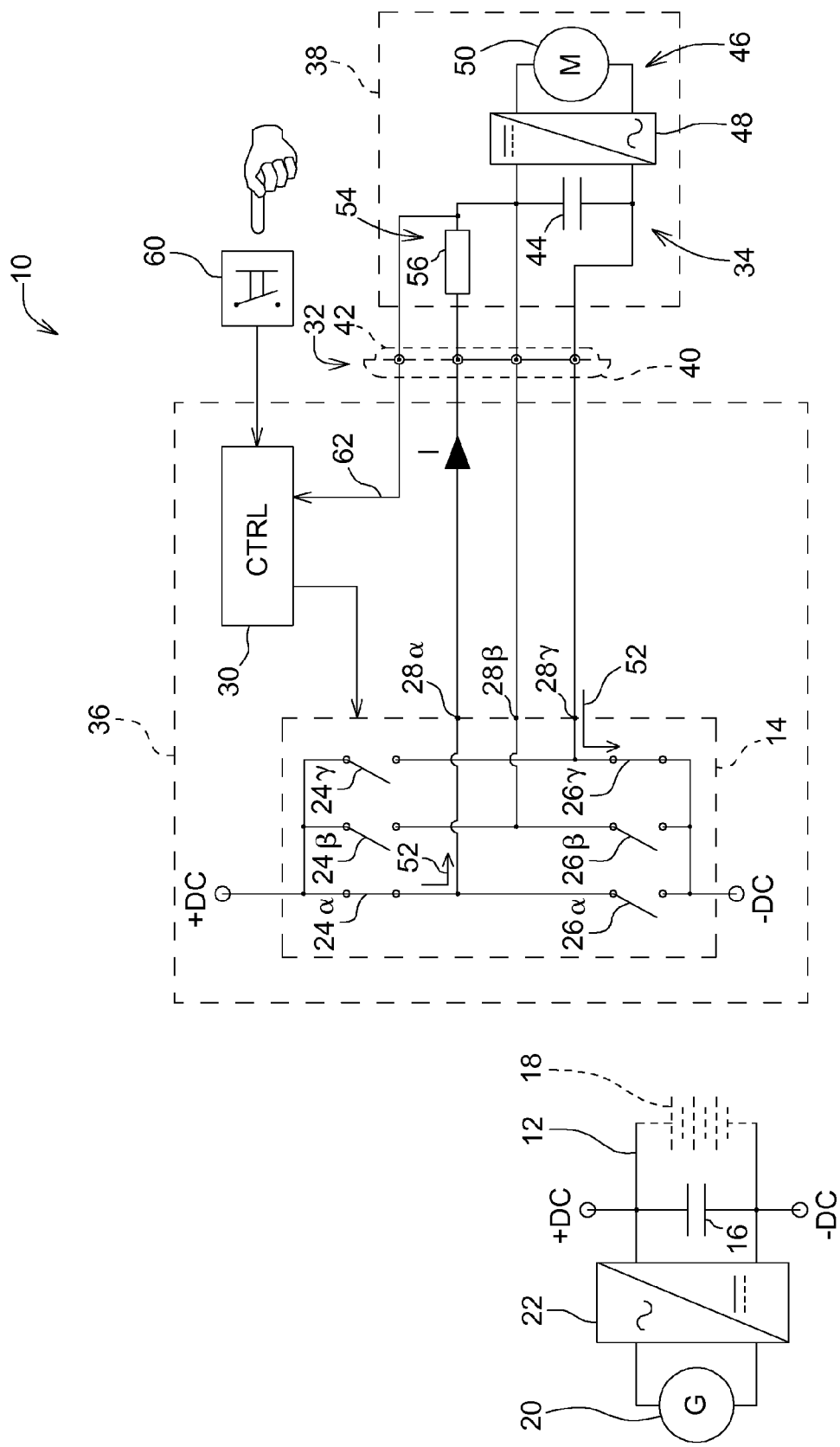
FIG. 3 is a schematic illustrating a second example embodiment of the device for surge current protection in accordance with the invention during the operation of a capacitive load on a three-phase inverter in a pre-charging mode.
Figure 4:
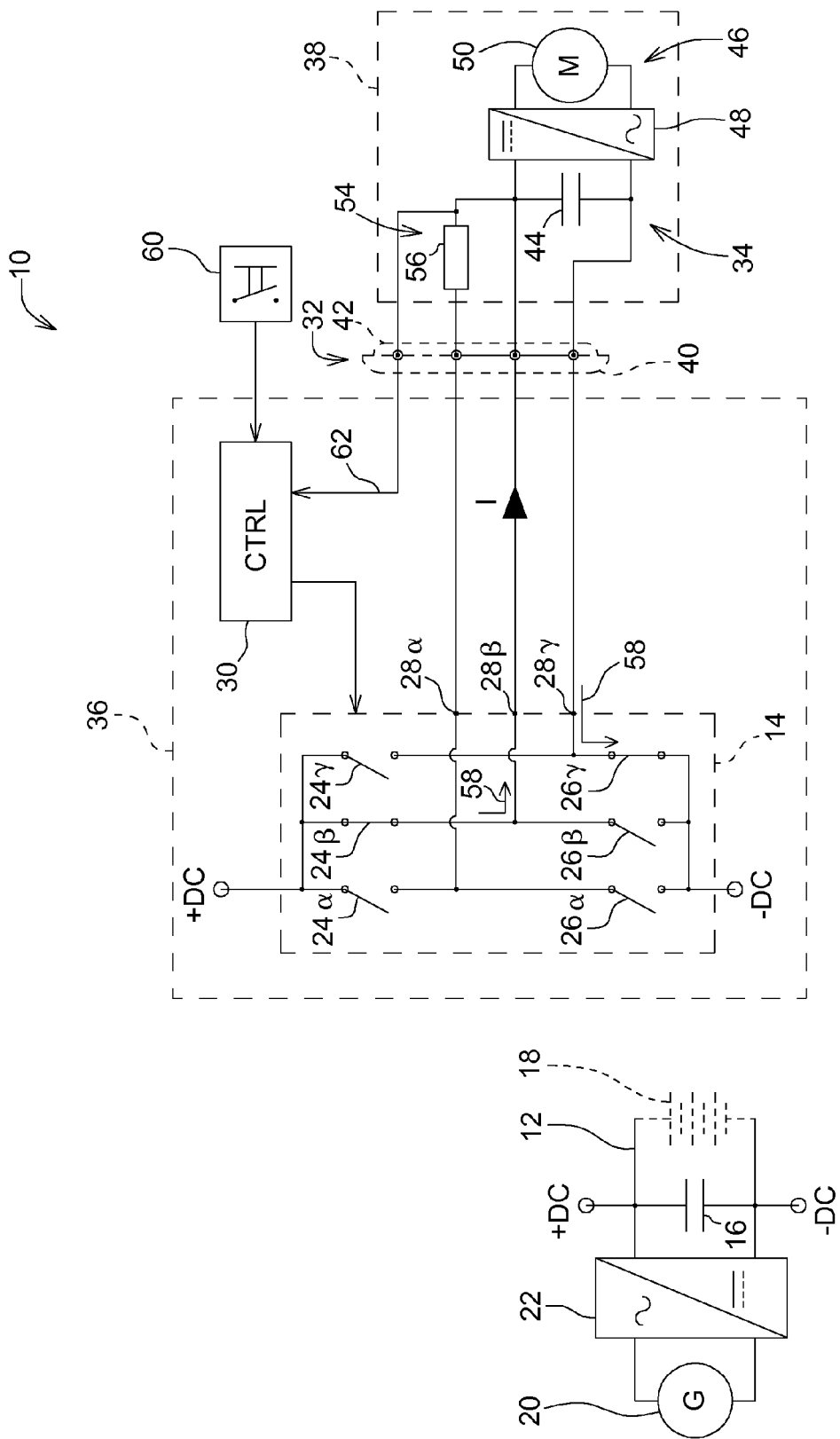
FIG. 4 is a schematic illustrating the example embodiment of the device in accordance with the invention shown in FIG. 3, in a normal operating mode, following the pre-charging mode.

FIGS. 3 and 4 show a second example embodiment of the device in accordance with the invention. This differs from the first example embodiment shown in FIGS. 1 and 2 only in that the current-limiting resistor 56 is associated with the drive module 38. With regard to the mode of functioning of the device 10, there are no differences, so that, in this respect, reference is made to the preceding embodiments.

What is claimed is:

1. A power supply module of a tractor for providing electrical energy to a drive module of an implement having a capacitive load, the power supply module comprising:
   a three-phase inverter with first, second, and third load outputs, the three-phase inverter having a plurality of switching devices; and
   a control device for controlling the switching devices, the control device configured to control the switching devices to connect the first, second, and third load outputs with a first direct current voltage potential or a second direct current voltage potential that differs from the first direct current voltage potential;
   wherein, in a pre-charging mode, the control device is configured to control the switching devices to connect the capacitive load with the first direct current voltage potential through a current-limiting element, the current-limiting element being a current-limiting resistor or a current-limiting inductance, and to directly connect the capacitive load to the second direct current voltage potential so that a start-up current between the three-phase inverter and the capacitive load is limited; and
   wherein, in a normal operating mode following the pre-charging mode, the control device is configured to control the switching devices to directly connect the capacitive load with the first direct current voltage potential via the second load output and to directly connect the capacitive load with the second direct current voltage potential via the third load output.

2. The power supply module of claim 1, wherein, during normal operating mode, the control device is configured to control the switching devices to at least from time to time short-circuit the current-limiting element.

3. The power supply module of claim 1, wherein the first direct current voltage potential is a positive supply voltage potential and/or the second direct voltage potential is a negative direct current voltage potential of a potential-free direct current circuit for supply of the three-phase inverter.

4. The power supply module of 1, wherein the capacitive load is a storage capacitor for operation of a direct current load.

5. The power supply module of 1, further comprising an electrical plug connection between the power supply module and the capacitive load, wherein the current-limiting element is associated with either the power supply module or with the capacitive load.

6. The power supply module of 5, wherein capacitive load is included in a drive module, wherein the current-limiting element is included in the drive module.

7. The power supply module of claim 5, wherein the current-limiting element is included in the power supply module.

8. A system for current surge protection during the operation of a capacitive load, the system comprising:
   a power supply module including
      a three-phase inverter with first, second, and third load outputs, the three-phase inverter having a plurality of switching devices, and
      a control device for controlling the switching devices, the control device configured to control the switching devices to connect the first, second, and third loads with a first direct current voltage potential or a second direct current voltage potential that differs from the first direct current voltage potential;
   a drive module including a capacitive load;
   a plug connection for connecting the power supply module with the drive module;
   wherein, in a pre-charging mode, the control device is configured to control the switching devices to connect the capacitive load with the first direct current voltage potential through a current-limiting element and to directly connect the capacitive load to the second direct current voltage potential so that a start-up current between the three-phase inverter and the capacitive load is limited; and
   wherein, in a normal operating mode following the pre-charging mode, the control device is configured to control the switching devices to directly connect the capacitive load with the first direct current voltage potential via the second load output and to directly connect the capacitive load with the second direct current voltage potential via the third load output.

9. The system of claim 8, wherein the current-limiting element is associated with the power supply module.

10. The system of claim 8, wherein the current-limiting element is associated with the drive module.

11. The system of claim 8, wherein the current-limiting element is a current-limiting resistor or a current-limiting inductance.

12. The system of claim 8, wherein the power-supply module is on a tractor and the drive module is on an implement.

13. The system of claim 12, wherein the current-limiting element is on the tractor.

14. The system of claim 12, wherein the current-limiting element is on the implement.

15. A method for surge current protection during the operation of a capacitive load on a three-phase inverter, the three-phase inverter having first, second, and third load outputs and associated switching devices for connecting the first, second, and third load puts with a first direct current voltage potential or a second direct current voltage potential that differs in comparison with the first direct current voltage potential, the method comprising:
   during a pre-charging mode, controlling the switching devices to connect the capacitive load with the first direct current voltage potential through a current-limiting element, the current-limiting element being a current-limiting resistor or a current-limiting inductance, and to directly connect the capacitive load to the second direct current voltage potential so that a start-up current between the three-phase inverter and the capacitive load is limited; and
   during a normal operating mode following the pre-charging mode, controlling the switching devices to directly connect the capacitive load with the first direct current voltage potential via the second load output and to directly connect the capacitive load with the second direct current voltage potential via the third load output.

* * * * *